(12) United States Patent
Grundvig

(10) Patent No.: US 11,784,785 B2
(45) Date of Patent: Oct. 10, 2023

(54) SYNCHRONIZATION SIGNAL (SYNC MARK) DETECTION USING MULTI-FREQUENCY SINUSOIDAL (MFS) SIGNAL-BASED FILTERING

(71) Applicant: Broadcom International Pte. Ltd., Singapore (SG)

(72) Inventor: Jeffrey Grundvig, Loveland, CO (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 17/728,470

(22) Filed: Apr. 25, 2022

(65) Prior Publication Data
US 2023/0254109 A1    Aug. 10, 2023

Related U.S. Application Data

(60) Provisional application No. 63/308,941, filed on Feb. 10, 2022.

(51) Int. Cl.
*H04L 7/04*    (2006.01)
*H04L 7/06*    (2006.01)

(52) U.S. Cl.
CPC .................................... *H04L 7/06* (2013.01)

(58) Field of Classification Search
CPC ... H04L 7/06; G11B 5/59655; G11B 5/59688; G11B 20/1217
USPC ................................ 375/362, 365, 368, 373
See application file for complete search history.

(56) References Cited

U.S. PATENT DOCUMENTS

| 8,824,081 | B1* | 9/2014 | Guo | ................... | G11B 5/59688 |
| | | | | | 360/77.06 |
| 9,633,689 | B1* | 4/2017 | Grundvig | ........... | G11B 20/1217 |
| 2011/0157737 | A1* | 6/2011 | Grundvig | ........... | G11B 5/59655 |
| 2013/0329313 | A1 | 12/2013 | Zhang et al. | | |
| 2014/0340780 | A1 | 11/2014 | Zhang et al. | | |

OTHER PUBLICATIONS

Extended European Search Report, DE 23155726.5, dated Jul. 7, 2023, 7 pages.

* cited by examiner

*Primary Examiner* — Phuong Phu
(74) *Attorney, Agent, or Firm* — Quarles & Brady LLP

(57) ABSTRACT

Novel tools and techniques are provided for implementing synchronization signal ("Sync Mark") detection using multi-frequency sinusoidal ("MFS") signal-based filtering. In various embodiments, a computing system may detect a location of a Sync Mark within a data signal, by using MFS signal-based filtering and a sliding window comprising successive search windows each having a bit length corresponding to a bit length of the Sync Mark to identify a portion of the data signal having a magnitude indicative of the Sync Mark. The computing system may refine the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being performed based on the MFS signal-based filtering.

20 Claims, 7 Drawing Sheets

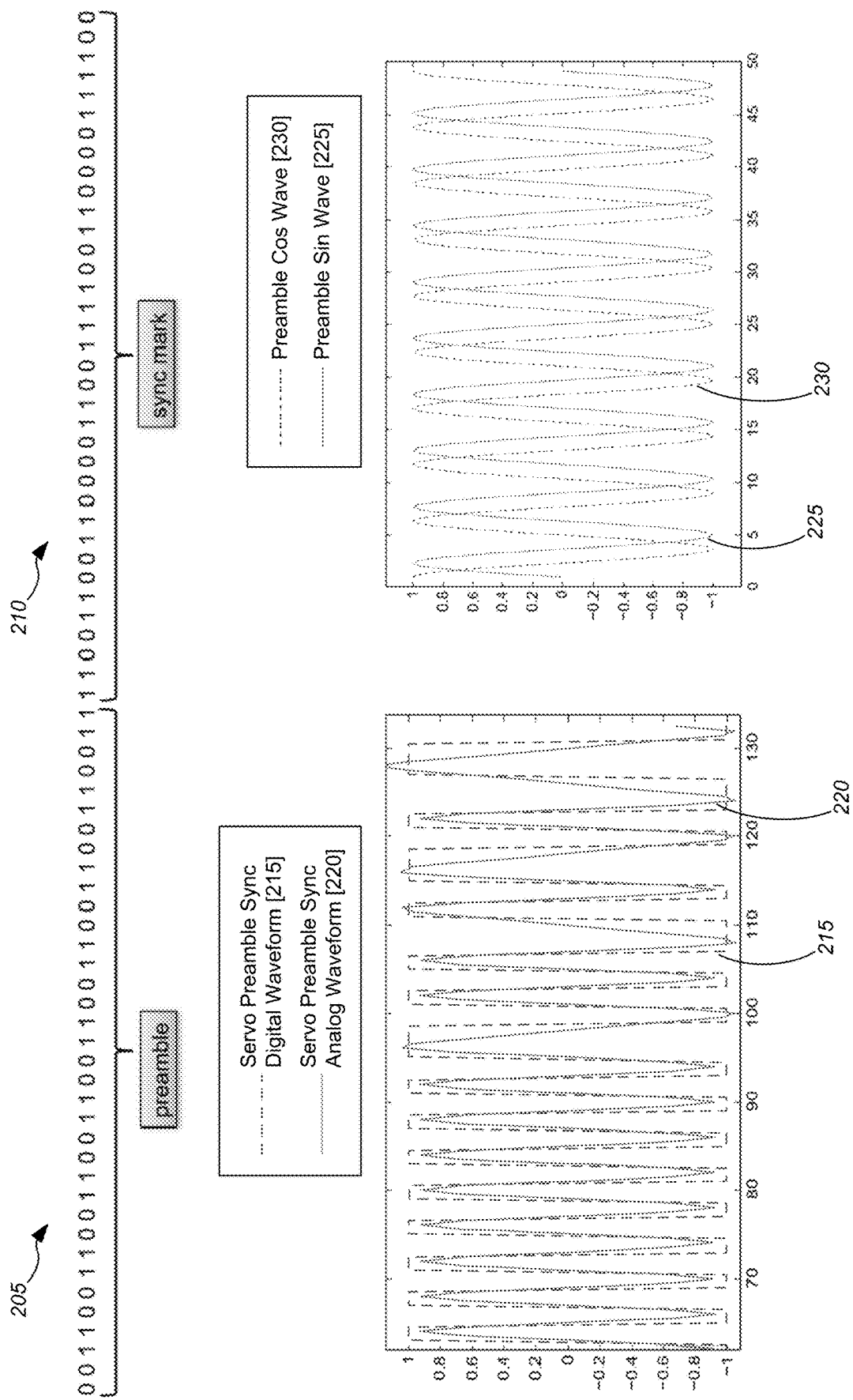

Sync Mark: 1110001110011110000011111100000111000
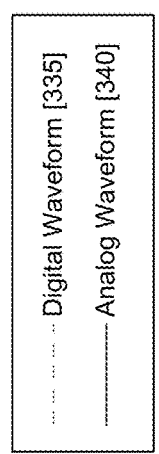
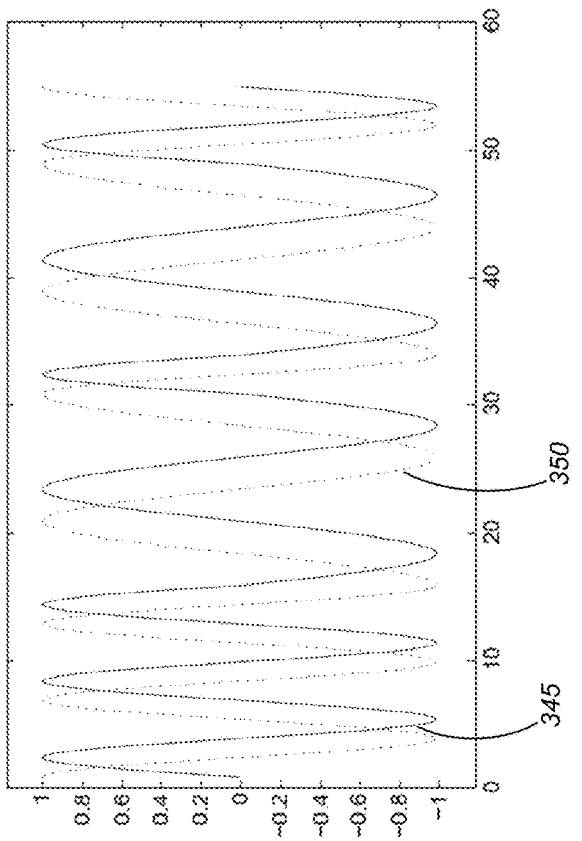
Fig. 3C
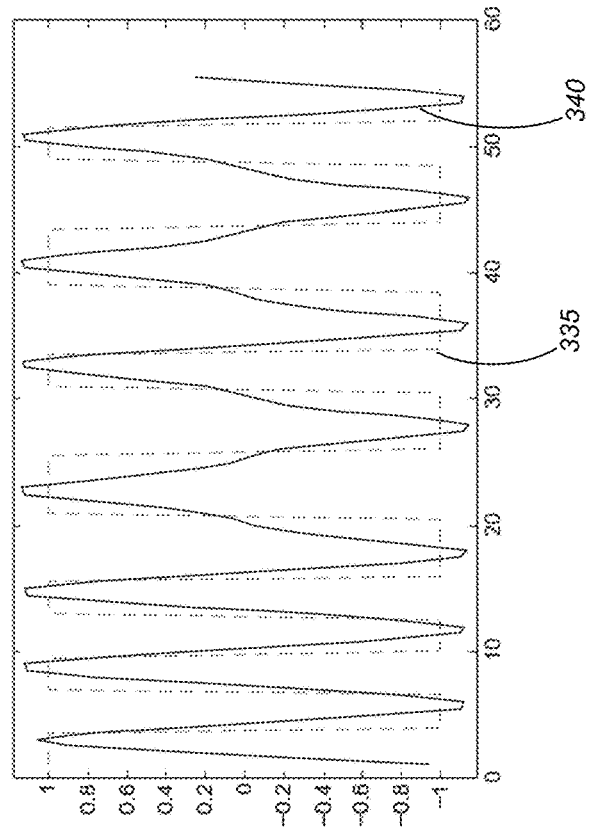
Fig. 3B

SYNCHRONIZATION SIGNAL (SYNC MARK) DETECTION USING MULTI-FREQUENCY SINUSOIDAL (MFS) SIGNAL-BASED FILTERING

CROSS-REFERENCES TO RELATED APPLICATIONS

This application claims priority to U.S. Patent Application Ser. No. 63/308,941 (the "'941 Application"), filed Feb. 10, 2022, by Jeffrey Grundvig, entitled, "Synchronization Signal (Sync Mark) Detection Using Multi-Frequency Sinusoidal (MFS) Signal-Based Filtering," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing optimized communications systems, and, more particularly, to methods, systems, and apparatuses for implementing synchronization signal ("Sync Mark") detection using multi-frequency or multiple frequency sinusoidal ("MFS") signal-based filtering.

BACKGROUND

A synchronization signal or Sync Mark is often used in communication systems to allow a data detection system to know where the data starts and hence when to start recovering data. In addition to the Sync Mark (which may be a bit pattern), a preamble field—which may be a single frequency periodic pattern or other pattern that can be used to measure the phase of the incoming signal in order to set or correct the sampling phase for both Sync Mark detection and data recovery—often precedes the Sync Mark.

In the case of hard disk drives ("HDDs"), for example, Sync Marks and preamble fields can be used for fields such as user data fields and servomechanism ("servo") fields. However, conventional HDDs currently use a fairly long preamble (typically, 100 or more bits long) followed by a Sync Mark for both user data and servo fields.

Hence, there is a need for more robust and scalable solutions for implementing optimized communications systems, and, more particularly, to methods, systems, and apparatuses for implementing synchronization signal ("Sync Mark") detection using multi-frequency or multiple frequency sinusoidal ("MFS") signal-based filtering.

SUMMARY

The techniques of this disclosure generally relate to tools and techniques for implementing optimized communications systems, and, more particularly, to methods, systems, and apparatuses for implementing synchronization signal ("Sync Mark") detection using multi-frequency or multiple frequency sinusoidal ("MFS") signal-based filtering.

In an aspect, a method is provided for implementing synchronization signal ("Sync Mark") detection. The method comprises detecting, using a computing system, a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark; and refining, using the computing system, the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being performed based on the MFS signal-based filtering.

In some embodiments, the computing system comprises at least one of a data signal detection processor, a digital signal processor, a data retrieval processor, a processor of a mobile device, a processor of a user device, a server computer, a cloud-based computing system over a network, or a distributed computing system, and/or the like. In some instances, the data signal may be used within a hard disk drive or other hardware, wherein the Sync Mark is among a plurality of Sync Marks disposed within the data signal, wherein the data signal comprises at least one data field and a servomechanical ("servo") field, each field being preceded by a Sync Mark among the plurality of Sync Marks. Alternatively, the data signal may be contained in a signal transmitted over one of a wireless medium or a wired medium.

According to some embodiments, using the sliding window comprises: measuring magnitudes of portions of the data signal within one search window; and successively moving the sliding window by one sample along the data signal to form another search window and measuring magnitudes of portions of the data signal within said other search window.

In some embodiments, detecting the location of the Sync Mark comprises multiplying MFS sine coefficients of the Sync Mark and MFS cosine coefficients of the Sync Mark with the portions of the data signal within each successive search window of the sliding window to produce data signal filtered by MFS sine coefficients and data signal filtered by MFS cosine coefficients, respectively, for each search window.

In some instances, the MFS sine coefficients of the Sync Mark are generated by: dividing the Sync Mark into a plurality of positive bit patterns each corresponding to consecutive binary ones in the Sync Mark and a plurality of negative bit patterns each corresponding to consecutive binary zeros in the Sync Mark, the plurality of positive bit patterns alternating with the plurality of negative bit patterns; producing a positive sine half cycle having a period corresponding to a number of consecutive binary ones for each of the plurality of positive bit patterns; producing a negative sine half cycle having a period corresponding to a number of consecutive binary ones for each of the plurality of negative bit patterns; and concatenating positive sine half cycles with negative sine half cycles in the same alternating order as in the corresponding binary ones and binary zeros in the Sync Mark to produce the MFS sine coefficients of the Sync Mark.

In some cases, the magnitude of the portion of the data signal within each search window is calculated by squaring a sum of the data signal filtered by MFS sine coefficients and squaring a sum of the data signal filtered by MFS cosine coefficients, and calculating a square root of a sum of the squared sum of the data signal filtered by MFS sine coefficients and the squared sum of the data signal filtered by MFS cosine coefficients. In some instances, identifying the portion of the data signal having the magnitude indicative of the Sync Mark comprises identifying a portion of the data signal having at least one of a maximum magnitude value or a magnitude value that exceeds a predetermined threshold magnitude value.

In some embodiments, identifying the portion of the data signal having the magnitude indicative of the Sync Mark comprises identifying a portion of the data signal having a maximum in-band to out-of-band energy ratio or having a maximum in-band to total signal energy ratio, wherein the in-band energy is calculated by squaring the magnitude of the portion of the data signal, wherein the total signal energy is calculated by summing the squares of all samples of the data signal within a search window, and wherein the out-of-band energy is calculated by subtracting the in-band energy from the total signal energy.

According to some embodiments, the phase of the portion of the data signal within each search window is calculated by taking an arctan of the sum of the data signal filtered by MFS sine coefficients divided by the sum of the data signal filtered by MFS cosine coefficients.

Merely by way of example, in some cases, the method may further comprise determining, using the computing system, a frequency offset between a frequency of the data signal and an internal clock frequency of an internal clock of the computing system, based on MFS sine coefficients and MFS cosine coefficients. In some instances, the method may further comprise adjusting, using the computing system, the internal clock frequency to match the frequency of the data signal, based on the determined frequency offset. In some cases, determining the frequency offset may comprise: measuring a phase for a first portion of the Sync Mark, by generating MFS sine coefficients and MFS cosine coefficients for the first portion of the Sync Mark and taking an arctan of the sum of the first portion of the Sync Mark filtered by MFS sine coefficients divided by the sum of the first portion of the Sync Mark filtered by MFS cosine coefficients; measuring a phase for a second portion of the Sync Mark, by generating MFS sine coefficients and MFS cosine coefficients for the second portion of the Sync Mark and taking an arctan of the sum of the second portion of the Sync Mark filtered by MFS sine coefficients divided by the sum of the second portion of the Sync Mark filtered by MFS cosine coefficients; calculating a phase difference between the measured phases for the first and second portions of the Sync Mark; and dividing the calculated phase difference by a number of bits between midpoints of the first and second portions of the Sync Mark.

In some embodiments, the method may further comprise determining, using the computing system, whether the data signal has been inverted in polarity, based on the phase of the identified portion of the data signal having the magnitude indicative of the Sync Mark.

In some cases, the Sync Mark replaces a combination of a single frequency synchronization signal and a preamble. In some instances, the bit length of the Sync Mark is less than a total bit length of the combination of the single frequency synchronization signal and the preamble. Alternatively, the bit length of the Sync Mark is the same as a total bit length of the combination of the single frequency synchronization signal and the preamble. Alternatively, the bit length of the Sync Mark is greater than a total bit length of the combination of the single frequency synchronization signal and the preamble.

According to some embodiments, the method may further comprise identifying, using the computing system, a start of a data field within the data signal based on the refined location of the Sync Mark within the data signal; and in response to identifying the start of the data field, performing, using the computing system, retrieval of data from the data field.

In another aspect, an apparatus is provided for implementing synchronization signal ("Sync Mark") detection using multi-frequency sinusoidal signal-based filtering. The apparatus comprises: at least one processor and a non-transitory computer readable medium communicatively coupled to the at least one processor. The non-transitory computer readable medium has stored thereon computer software comprising a set of instructions that, when executed by the at least one processor, causes the apparatus to: detect a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark; and refine the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being performed based on the MFS signal-based filtering.

In some embodiments, the computing system comprises at least one of a data signal detection processor, a digital signal processor, a data retrieval processor, a processor of a mobile device, a processor of a user device, a server computer, a cloud-based computing system over a network, or a distributed computing system, and/or the like. In some instances, the data signal is contained in a hard disk drive, wherein the Sync Mark is among a plurality of Sync Marks disposed within the data signal, wherein the data signal comprises at least one data field and a servomechanical ("servo") field, each field being preceded by a Sync Mark among the plurality of Sync Marks. Alternatively, the data signal is contained in a signal transmitted over one of a wireless medium or a wired medium.

According to some embodiments, detecting the location of the Sync Mark comprises multiplying MFS sine coefficients of the Sync Mark and MFS cosine coefficients of the Sync Mark with the portions of the data signal within each successive search window of the sliding window to produce data signal filtered by MFS sine coefficients and data signal filtered by MFS cosine coefficients, respectively, for each search window.

In some instances, the magnitude of the portion of the data signal within each search window is calculated by squaring a sum of the data signal filtered by MFS sine coefficients and squaring a sum of the data signal filtered by MFS cosine coefficients, and calculating a square root of a sum of the squared sum of the data signal filtered by MFS sine coefficients and the squared sum of the data signal filtered by MFS cosine coefficients.

Alternatively, identifying the portion of the data signal having the magnitude indicative of the Sync Mark comprises identifying a portion of the data signal having a maximum in-band to out-of-band energy ratio or a maximum in-band to total signal energy ratio, wherein the in-band energy is calculated by squaring the magnitude of the portion of the data signal, wherein the total signal energy is calculated by summing the squares of all samples of the data signal within a search window, and wherein the out-of-band energy is calculated by subtracting the in-band energy from the total signal energy.

In some embodiments, the phase of the portion of the data signal within each search window is calculated by taking an arctan of the sum of the data signal filtered by MFS sine coefficients divided by the sum of the data signal filtered by MFS cosine coefficients.

In yet another aspect, a computing system is provided that comprises logic that when executed is configured to: detect a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark, the MFC filtering comprising multiplying MFS sine coefficients of the Sync Mark and MFS cosine coefficients of the Sync Mark with the portions of the data signal within each successive search window of the sliding window to produce data signal filtered by MFS sine coefficients and data signal filtered by MFS cosine coefficients, respectively, for each search window; and refine the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being calculated by taking an arctan of the sum of the data signal filtered by MFS sine coefficients divided by the sum of the data signal filtered by MFS cosine coefficients.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A and 2B are graphical diagrams illustrating an example of a Sync Mark detection approach using single frequency signal-based filtering and preamble.

FIGS. 3A-3E are graphical diagrams illustrating various non-limiting examples of Sync Mark detection using MFS signal-based filtering, in accordance with various embodiments.

DETAILED DESCRIPTION

Overview

Figure 1:
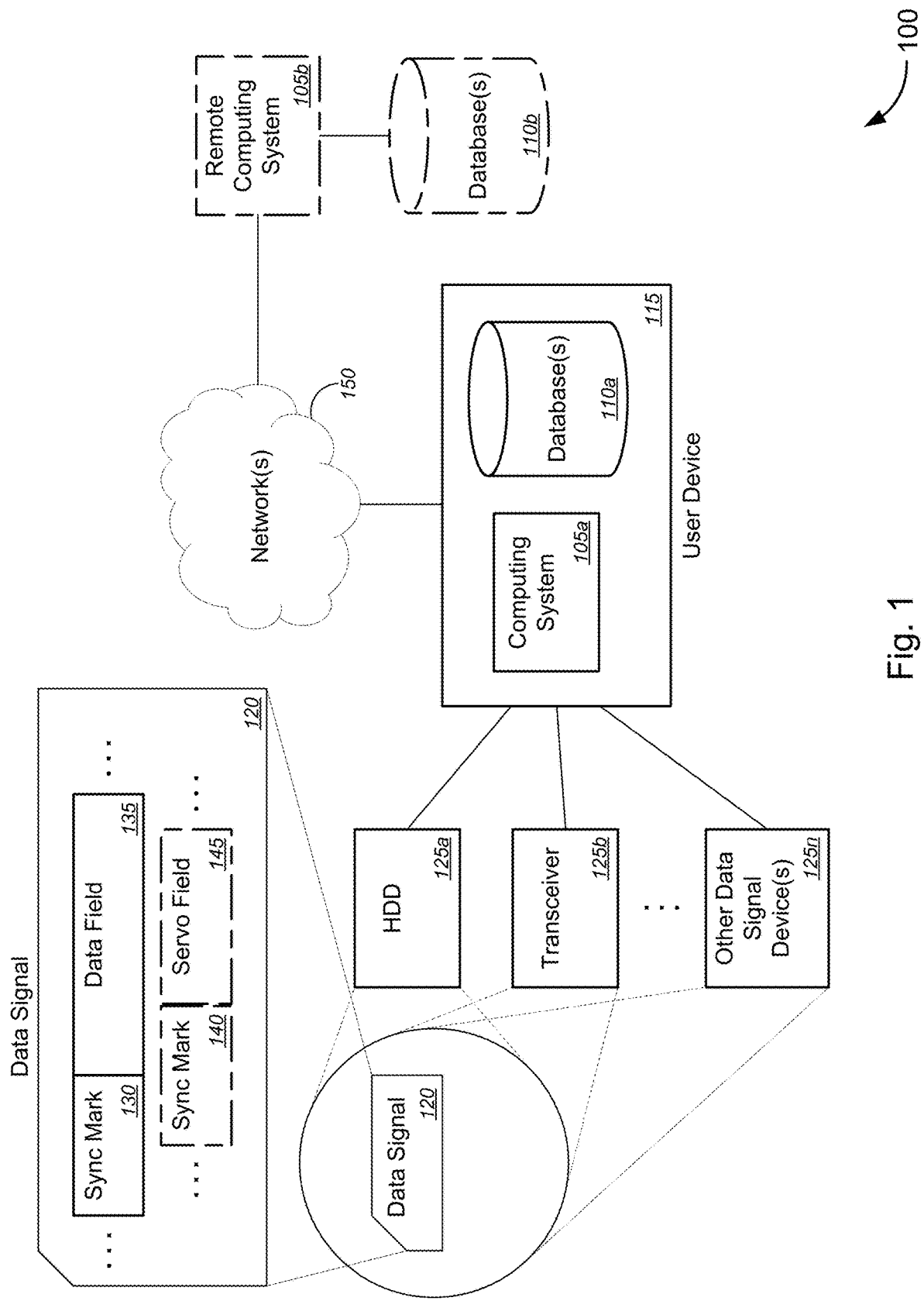
FIG. 1 is a schematic diagram illustrating a system for implementing synchronization signal ("Sync Mark") detection using multi-frequency or multiple frequency sinusoidal ("MFS") signal-based filtering, in accordance with various embodiments.

Various embodiments provide tools and techniques for implementing optimized communications systems, and, more particularly, to methods, systems, and apparatuses for implementing synchronization signal ("Sync Mark") detection using multi-frequency or multiple frequency sinusoidal ("MFS") signal-based filtering.

In various embodiments, the preamble and the Sync Mark are combined into a single combined field that is significantly shorter than what is currently being used for the preamble and the Sync Mark. Additionally, this shorter, single combined field will allow for higher performance than what has been previously done, by improving Sync Mark detection performance, while reducing bandwidth, and thus allows for more bandwidth to be used for other purposes. The various embodiments described below illustrate how to improve Sync Mark detection performance for a given Sync Mark pattern length and how to extract the sub-bit phase for the Sync Mark pattern without the need for a separate preamble field, which is typically used for that purpose. In some embodiments, the multi-frequency sinusoidal calculation provides the magnitude and the phase of a multiple frequency or complex pattern signal allowing for simple magnitude comparison techniques, as well as in-band to out-of-band energy comparison techniques to be used for detecting the Sync Mark. Since it improves Sync Mark detection performance, while reducing bandwidth, the various embodiments may be used in a variety of applications for any communication system (not limited to HDDs).

These and other aspects of the system and method for implementing multi-frequency sinusoidal Sync Mark detection are described in greater detail with respect to the figures.

The following detailed description illustrates a few embodiments in further detail to enable one of skill in the art to practice such embodiments. The described examples are provided for illustrative purposes and are not intended to limit the scope of the invention.

In the following description, for the purposes of explanation, numerous details are set forth in order to provide a thorough understanding of the described embodiments. It will be apparent to one skilled in the art, however, that other embodiments of the present invention may be practiced without some of these details. In other instances, some structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments as described herein—while embodying (in some cases) software products, computer-performed methods, and/or computer systems—represent tangible, concrete improvements to existing technological areas, including, without limitation, communications technology, data transfer technology, data retrieval technology, hard disk drive ("HDD") technology, and/or the like. In other aspects, some embodiments can improve the functioning of user equipment or systems themselves (e.g., communications systems, data transfer systems, data retrieval systems, HDD systems, etc.), for example, by detecting, using a computing system, a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark; and refining, using the computing system, the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being performed based on the MFS signal-based filtering; and/or the like.

In particular, to the extent any abstract concepts are present in the various embodiments, those concepts can be implemented as described herein by devices, software, systems, and methods that involve novel functionality (e.g., steps or operations), such as, combining the preamble and the Sync Mark into a single combined field that, in some cases, is significantly shorter than what is currently being used for the preamble and the Sync Mark; using multi-frequency sinusoidal calculation to provide the magnitude and the phase of a multiple frequency or complex pattern signal allowing for simple magnitude comparison techniques, as well as in-band to out-of-band energy comparison techniques to be used for detecting the Sync Mark and/or the like, to name a few examples, that extend beyond mere conventional computer processing operations. These functionalities can produce tangible results outside of the implementing computer system, including, merely by way of example, optimized Sync Mark detection that allows for higher performance (compared with conventional techniques), while reducing bandwidth, thus allowing for more bandwidth to be used for other purposes by obviating need for a separate preamble field, at least some of which may be observed or measured by users, HDD manufacturers, other communications systems manufacturers, etc.

Some Embodiments

We now turn to the embodiments as illustrated by the drawings. FIGS. 1-5 illustrate some of the features of the method, system, and apparatus for implementing optimized communications systems, and, more particularly, to methods, systems, and apparatuses for implementing synchronization signal ("Sync Mark") detection using multi-frequency or multiple frequency sinusoidal ("MFS") signal-based filtering, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing synchronization signal ("Sync Mark") detection using multi-frequency or multiple frequency sinusoidal ("MFS") signal-based filtering, in accordance with various embodiments.

In the non-limiting embodiment of FIG. 1, system 100 may comprise computing system 105 and corresponding database(s) 110. In some cases, the computing system 105 and corresponding database(s) 110 may be disposed within a user device 115 (denoted in FIG. 1 by computing system 105*a* and corresponding database(s) 110*a*, or the like), which may include, but is not limited to, one of a smart phone, a mobile phone, a tablet computer, a laptop computer, a desktop computer, a smart television, a media streaming device, or a media player, and/or the like. Alternatively, or additionally, the computing system 105 and corresponding database(s) 110 may be accessible over one or more networks(s) 150 (denoted in FIG. 1 by remote computing system 105*b* and corresponding database(s) 110*b*, or the like), and may include, without limitation, at least one of a server computer, a cloud-based computing system over a network, or a distributed computing system, and/or the like.

In some embodiments, the computing system 105 may include, but is not limited to, at least one of a data signal detection processor(s), a digital signal processor(s), a data retrieval processor(s), or other processor(s), and/or the like. In some cases, the database(s) 110 may include, but is not limited to, at least one of read-only memory ("ROM"), programmable read-only memory ("PROM"), erasable programmable read-only memory ("EPROM"), electrically erasable programmable read-only memory ("EEPROM"), flash memory, other non-volatile memory devices, random-access memory ("RAM"), static random-access memory ("SRAM"), dynamic random-access memory ("DRAM"), synchronous dynamic random-access memory ("SDRAM"), virtual memory, a RAM disk, or other volatile memory devices, non-volatile RAM devices, and/or the like.

Although not shown, user device 115 may further include a communications system that is used to communicate with other devices from which the user device receives a data signal (e.g., data signal 120, or the like) and/or to which the user device transmits the data signal. In some cases, the communications system may include wireless communications devices capable of communicating using protocols including, but not limited to, at least one of Bluetooth™ communications protocol, Wi-Fi® communications protocol, or other 802.11 suite of communications protocols, ZigBee communications protocol, Z-wave communications protocol, or other 802.15.4 suite of communications protocols, cellular communications protocol (e.g., 3G, 4G, 4G LTE, 5G, etc.), or other suitable communications protocols, and/or the like.

In some embodiments, the data signal that is received or otherwise analyzed by computing system 105 (e.g., data signal 120, or the like) may be used within a hard disk drive ("HDD") (e.g., HDD 125a, or the like) or other hardware. Alternatively, the data signal that is received or otherwise analyzed by computing system 105 may be contained in a signal transmitted over one of a wireless medium (and received by a transceiver, such as transceiver 125b, or the like) or a wired medium (and received by an input port, or the like). In some cases, system 100 may further comprise other data signal device 125n, or the like, which may include the input ports, as well as cables, other memory storage devices, receiver devices, etc. Although FIG. 1 depicts each device 125 as being external to, yet communicatively coupled with, user device 115, the various embodiments are not so limited, and one or more of HDD 125a, transceiver 125b, and/or other data signal device(s) 125n may be external to, yet communicatively coupled with, user device 115. Alternatively, one or more of HDD 125a, transceiver 125b, and/or other data signal device(s) 125n may each be disposed within user device 115 (not shown in FIG. 1).

According to some embodiments, the data signal (e.g., data signal 120, or the like), which may be stored or contained in HDD 125a, received wirelessly via transceiver 125b, or otherwise stored or received by other data signal device(s) 125n, may include a synchronization signal ("Sync Mark") (e.g., Sync Mark 130, or the like) preceding a data field (e.g., data field 135, or the like) and/or a Sync Mark (e.g., Sync Mark 140 (optional), or the like) preceding a servomechanical ("servo") field (e.g., servo field 145 (optional; present in HDDs, or the like), etc.). In some cases, the Sync Mark (e.g., Sync Mark 130 and/or Sync Mark 140, or the like) is among a plurality of Sync Marks disposed within the data signal (e.g., data signal 120, or the like). In such a case, each field (e.g., each of one or more data fields 135 and/or each of one or more servo fields 145 (if any), etc.) may be preceded by a Sync Mark (e.g., Sync Mark 130 and/or Sync Mark 140 for corresponding data field(s) 135 and/or servo field(s) 145, respectively, or the like) among the plurality of Sync Marks.

In operation, computing system 105a and/or remote computing system 105b (collectively, "computing system") may perform the method of implementing Sync Mark detection using multi-frequency or multiple frequency sinusoidal ("MFS") signal-based filtering, as shown, and described below, with respect to FIG. 4.

These and other functions of the system 100 (and its components) are described in greater detail below with respect to FIGS. 3 and 4.

FIGS. 2A and 2B (collectively, "FIG. 2") are graphical diagrams illustrating an example 200 of a Sync Mark detection approach using single frequency signal-based filtering and preamble.

In some approaches, in addition to the Sync Mark (which may be a bit pattern) (e.g., Sync Mark 210), a preamble field (e.g., Preamble field 205) often precedes the Sync Mark where the preamble field is a single frequency periodic pattern that can be used to measure the phase of the incoming signal in order to set the sampling phase for data recovery. As used in HDDs, the Sync Mark 210 and the Preamble field 205 are used for both user data fields and servo fields. In some cases, a single bin Discrete Fourier Transform ("DFT") is used in HDDs to determine the phase of the preamble signal, and the determined phase is then used to set the sampling phase for the Sync Mark detection and data detection. The magnitude of this same DFT is also often used to adjust the amplitude of the incoming signal with a gain loop.

As shown in FIG. 2, a typical servo waveform that is used for HDDs starts with a periodic preamble pattern (e.g., Preamble field 205) followed by a Sync Mark (e.g., Sync Mark 210). This pattern is written to the disk as a digital bit stream such as shown in FIG. 2. In this example pattern, the preamble pattern (or Preamble field 205) is shown as a 36-bit preamble, which is followed by a 36-bit Sync Mark 210. In reality, the preamble pattern is typically closer to 100 or more bits long. When the waveform is read from the disk (e.g., HDD), through the bandlimited channel and sampled, it looks similar to the noise free medium gray solid line waveform 220 shown in the graph in FIG. 2A. In reality, the readback signal would contain noise. However, FIG. 2A is merely provided for illustrative purposes, and thus noise has been omitted. In FIG. 2A, the dark gray dashed line or curve 215 denotes standard servo preamble sync digital waveform, while the medium gray solid line or curve 220 denotes standard servo preamble sync analog waveform.

To determine the phase and amplitude of the servo readback waveform, a single bin DFT is computed over a portion of the preamble signal. Typically, the preamble has to be longer than the DFT window length in order to insure that, with some uncertainty in the start of where the DFT computation begins, the entire DFT window fits within the actual preamble portion of the readback signal. A real signal single bin DFT can be and typically is computed by multiplying the signal of interest (e.g., the readback signal) with a sine wave and a cosine wave of the same frequency or period as the preamble signal. The graph in FIG. 2B depicts pictorially what the sine and cosine waves or coefficients look like for a preamble signal that has a 4-bit period and for which the readback sample rate is twice the bit rate.

The magnitude of the preamble signal is then computed by:

$$\text{preamble\_magnitude} = \sqrt{\text{sin\_sum}^2 + \text{cos\_sum}^2}, \quad \text{(Eqn. 1)}$$

where sin_sum is a sum of the data signal filtered by single frequency sine coefficients (e.g., as shown in FIG. 2B by the medium gray solid line or curve 225, which denotes preamble sine wave coefficients), while cos_sum is a sum of the data signal filtered by single frequency cosine coefficients (e.g., as shown in FIG. 2B by the dark gray dashed line or curve 230, which denotes preamble cosine wave coefficients).

The phase of the preamble signal that is used to set the sampling phase for both sync mark detection and data detection is computed by:

$$\text{preamble\_phase} = \text{ARCTAN}\left(\frac{\text{sin\_sum}}{\text{cos\_sum}}\right). \quad \text{(Eqn. 2)}$$

In some approaches, the single bin DFT sin/cos coefficient values are generated simply by taking the binary bit sequence used to write the preamble pattern and creating sine and cosine waves that match the period of the binary bits preamble sequence. For example for a 16 bit preamble pattern of "1 1 0 0 1 1 0 0 1 1 0 0 1 1 0 0," which has a 4 bit period (T), the sine filter coefficients would be $\sin(2*\pi*n/T)$, where T=4 and n={0:15}, while the cosine filter coefficients would be $\cos(2*\pi*n/T)$, where T=4 and n={0:15}. If the readback signal was processed at a sample rate twice as fast as the bit rate when written, then period T would be 8 instead of 4 and n={0:31} (i.e., twice as many coefficients).

However, in these approaches, the Sync Mark detection system and methods require a long preamble, which limits the length of the Sync Mark, as well as limiting the amount of data within the signal (particularly in the case of HDDs). As described herein with respect to FIGS. 1, 3, and 4, or the like, the system/apparatus and methods for implementing Sync Mark detection using MFS signal-based filtering obviates the need for a preamble, while achieving comparable if not better performance than the above-mentioned approaches.

FIGS. 3A-3E (collectively, "FIG. 3") are graphical diagrams illustrating various non-limiting examples 300 of Sync Mark detection using MFS signal-based filtering, in accordance with various embodiments.

Figure 3A:
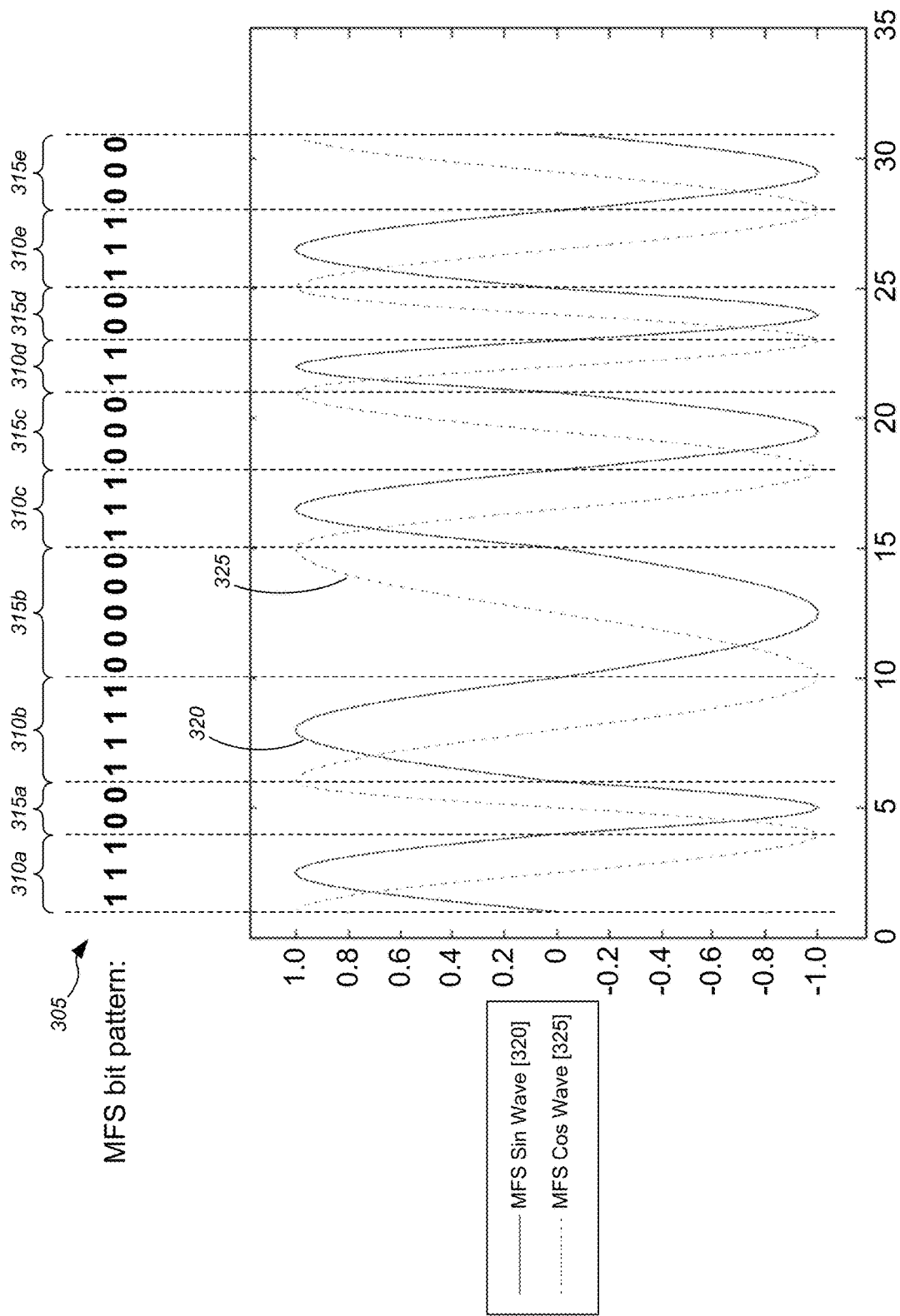

As shown in FIG. 3A, a multiple frequency sinusoidal ("MFS") bit pattern 305 may be used instead of the single frequency preamble or Sync Mark approach. To create a sine wave of variable frequency but continuously smooth phase with no discontinuities a half cycle at a time, the following technique may be implemented.

The MFS sine coefficients of the Sync Mark are generated by: (1) dividing the Sync Mark (e.g., MFS bit pattern 305, or the like) into a plurality of positive bit patterns (e.g., positive bit patterns 310a-310e, or the like) each corresponding to consecutive binary "ones" or "1s" in the Sync Mark and a plurality of negative bit patterns (e.g., negative bit patterns 315a-315e, or the like) each corresponding to consecutive binary "zeros" or "0s" in the Sync Mark, the plurality of positive bit patterns alternating with the plurality of negative bit patterns; (2) producing a positive sine half cycle having a period corresponding to a number of consecutive binary ones for each of the plurality of positive bit patterns (denoted by the portions of the dark gray solid line or curve 320 bounded by dashed lines corresponding to the positive bit patterns 310a-310e, as shown, e.g., in FIG. 3A); (3) producing a negative sine half cycle having a period corresponding to a number of consecutive binary ones for each of the plurality of negative bit patterns (denoted by the portions of the dark gray solid line or curve 320 bounded by dashed lines corresponding to the negative bit patterns 315a-315e, as shown, e.g., in FIG. 3A); and (4) concatenating positive sine half cycles with negative sine half cycles in the same alternating order as in the corresponding binary ones and binary zeros in the Sync Mark to produce the MFS sine coefficients of the Sync Mark (e.g., as depicted by dark gray solid line or curve 320 in FIG. 3A). For example, the MFS sine coefficients for this bit pattern 305 (e.g., "1 1 1 0 0 1 1 1 1 0 0 0 0 0 1 1 1 0 0 0 1 1 0 0 1 1 1 0 0 0") start with a positive half cycle of period 3 (e.g., bit pattern 310a), followed by a negative half cycle of period 2 (e.g., bit pattern 315a), followed by a positive half cycle of period 4 (e.g., bit pattern 310b), followed by a negative half cycle of period 5 (e.g., bit pattern 315b), and so on.

Similarly, the MFS cosine coefficients of the Sync Mark are generated by: (1) dividing the Sync Mark into a plurality of positive bit patterns each corresponding to consecutive binary ones in the Sync Mark and a plurality of negative bit patterns each corresponding to consecutive binary zeros in the Sync Mark, the plurality of positive bit patterns alternating with the plurality of negative bit patterns; (2) producing a positive cosine half cycle having a period corresponding to a number of consecutive binary ones for each of the plurality of positive bit patterns; (3) producing a negative cosine half cycle having a period corresponding to a number of consecutive binary ones for each of the plurality of negative bit patterns; and (4) concatenating positive cosine half cycles with negative cosine half cycles in the same alternating order as in the corresponding binary ones and binary zeros in the Sync Mark to produce the MFS cosine coefficients of the Sync Mark (e.g., as depicted by light gray dashed line or curve 325 in FIG. 3A). Alternatively, the MFS cosine coefficients can be generated by phase shifting the MFS sine coefficients.

As shown in FIG. 3A, the frequency of the MFS sine (or cosine) wave changes instantaneously at each sine wave zero crossing but the phase is continuously smooth.

To detect this MFS signal, the multiple frequency sin/cos coefficients are then multiplied with the incoming signal samples in sliding window fashion, in a similar manner as is done with a finite impulse response ("FIR") filter or matched filter. For example, a search window having a predetermined bit length (which may be a known length, or number of bits, of a Sync Mark to be detected; such as, but not limited to, 30, 36, or 54 bits, as shown in FIGS. 3A-3D, or the like) is used on an incoming signal sample, whereby a first portion of the incoming signal sample having the same number of bits as the sliding window is multiplied by the multiple frequency sin/cos coefficients. The search window then shifts over by a predetermined amount (such as, but not limited to, by one bit) [hence, "sliding window"], and a next portion of the incoming signal sample having the same number of bits as the search window is multiplied by the multiple frequency sin/cos coefficients. And so on. Analysis is made on the results of each such operation on the portions of the incoming signal sample to detect the MFS signal (e.g., by identifying signal magnitude of the MFS signal that is greatest within some search window, or for which the signal magnitude is above a predetermined threshold, or the like), as described in detail below.

Magnitude and phase for the MFS signal of interest can be calculated using these multiple frequency sin/cos coefficients as follows, with the magnitude of the multi frequency signal is computed by:

$$\text{mfs\_signal\_magnitude} = \sqrt{\text{mfs\_sin\_sum}^2 + \text{mfs\_cos\_sum}^2}, \quad \text{(Eqn. 3)}$$

where mfs_sin_sum is a sum of the data signal filtered by MFS sine coefficients (as shown, e.g., in FIG. 3A by the dark gray solid line or curve 320, which denotes MFS sine wave coefficients), while mfs_cos_sum is a sum of the data signal filtered by MFS cosine coefficients (as shown, e.g., in FIG. 3A by the light gray dashed line or curve 325, which denotes MFS cosine wave coefficients).

The phase of the MFS signal, which can be used for data detection and other processes, is computed by:

$$\text{mfs\_signal\_phase} = \text{ARCTAN}\left(\frac{\text{mfs\_sin\_sum}}{\text{mfs\_cos\_sum}}\right). \quad \text{(Eqn. 4)}$$

The location of the Sync Mark would then typically be identified as the bit position for which the mfs_signal_magnitude is greatest within some search window, or for which the signal magnitude is above a predetermined threshold. This initial bit position based on the peak of the mfs_signal_magnitude can be further improved to a much more exact location using the mfs_signal_phase. In fact, even when the initial bit position based on mfs_signal_magnitude is a few bits in error due to noise, the mfs_signal_phase can still be used to provide the correct location including the sub-bit phase.

Merely by way of example, in some cases, this MFS detection technique may be used to measure frequency offset, which is defined as the difference in frequency of the signal being measured (or the bit rate of the incoming signal) compared to the internal clock frequency (or the bit rate based on the internal clock) of the circuit being used to detect the Sync Mark and to recover data. Ideally the two match exactly, but in reality they may not be exactly the same. The MFS technique can be used to measure a frequency difference or "frequency offset" between the two frequencies by measuring the phase of the Sync Mark pattern at two different points in time or two sub-portions of the Sync Mark and determining how much the phase changes between those two points in time. More particularly, two separate MFS sine and cose coefficients could be generated for two different portions of the Sync Mark. In some cases, the two portions may be adjacent to each other. Alternatively, the two portions may be separated by a third portion. In some instances, the two portions may be adjacent and non-overlapping. Alternatively, the two portions may be overlapping. In some cases, the two portions may have the same (bit) length. Alternatively, the two portions may have different (bit) lengths. Knowing the frequency offset can allow for better data detection and/or for adjusting the internal clock rate to match the signal more exactly.

For example, the Sync Mark may have zero crossings for the sine wave (or peak crossings for the cosine wave) at the start, at the exact halfway point, and at the end of the Sync Mark, in which case a first portion includes the first half of the Sync Mark, while the second portion includes the second half of the Sync Mark, and both portions have the same length. In another example, the Sync Mark may have zero crossings for the sine wave (or peak crossings for the cosine wave) at the start, at a point approximately one-third of the length of the Sync Mark closest to the start, at a point approximately one-quarter of the length of the Sync Mark closest to the end, and at the end of the Sync Mark, in which case a first portion includes the first one-third (⅓) of the Sync Mark, while the second portion includes the last one-quarter (¼) of the Sync Mark, with five-twelves (5/12) of the Sync Mark in between the first and second portions.

The frequency offset may be calculated based on the following equation:

$$\text{frequency\_offset} = \frac{\text{delta\_phase}}{\text{delta\_time}}, \quad \text{(Eqn. 5)}$$

where delta_phase may be determined by: measuring a phase for a first portion of the Sync Mark, by generating MFS sine coefficients and MFS cosine coefficients for the first portion of the Sync Mark and taking an arctan of the sum of the first portion of the Sync Mark filtered by MFS sine coefficients divided by the sum of the first portion of the Sync Mark filtered by MFS cosine coefficients; measuring a phase for a second portion of the Sync Mark, by generating MFS sine coefficients and MFS cosine coefficients for the second portion of the Sync Mark and taking an arctan of the sum of the second portion of the Sync Mark filtered by MFS sine coefficients divided by the sum of the second portion of the Sync Mark filtered by MFS cosine coefficients; and calculating a phase difference between the measured phases for the first and second portions of the Sync Mark; where delta_time may be determined by: determining a number of bits between midpoints of the first and second portions of the Sync Mark.

Another advantage of this MFS detection technique is that it easily allows for a non-linear detection method, such as, comparing in-band energy to out-of-band energy or to total signal energy within some search window, where window length for energy computation would be set to the predetermined length of the Sync Mark.

The in-band energy is calculated by squaring the magnitude of the portion of the data signal, as follows:

$$\text{in-band\_energy} = (\text{mfs\_signal\_magnitude})^2. \quad \text{(Eqn. 6)}$$

The total signal energy is calculated by summing the squares of all samples of the data signal within a search window, as follows:

$$\text{total\_signal\_energy} = \Sigma[(\text{each\_signal\_sample})^2]. \quad \text{(Eqn.7)}$$

The out-of-band energy is calculated by subtracting the in-band energy from the total signal energy, as follows:

$$\text{out-of-band\_energy} = \text{total\_signal\_energy} - \text{in-band\_energy}. \quad \text{(Eqn. 8)}$$

FIGS. 3B and 3C depict a non-limiting example of a 54-bit Sync Mark pattern (e.g., Sync Mark 330, or the like). Plots of the digital waveform (e.g., digital waveform 335, or the like) compared to the band limited noise free sampled readback signal (e.g., analog waveform 340, or the like) are shown, e.g., in FIG. 3B. In some cases, for matched filter comparison, the matched filter coefficients are the same as the noise free readback signal. Here, the readback sample rate is twice the written bit rate, although the various embodiments are not limited to such. Plots of the corresponding MFS sine coefficients (e.g., MFS sine wave 345, or the like) and MFS cosine coefficients (e.g., MFS cosine wave 350, or the like) are shown in FIG. 3C.

Figures 3D, 3E:
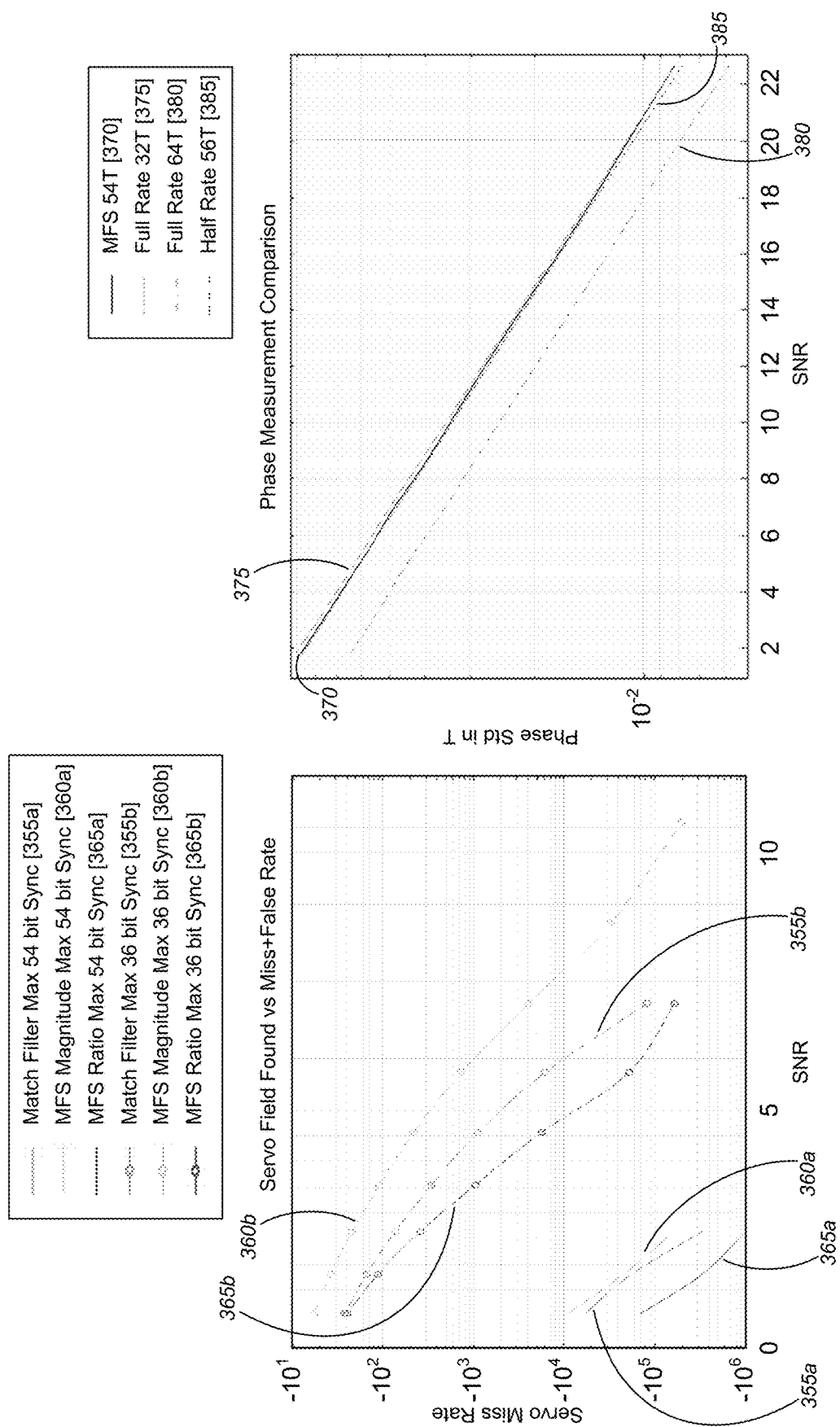

FIGS. 3D and 3E depict simulated results for Sync Mark detection of a 54-bit Sync Mark pattern (e.g., Sync Mark 330, or the like) comparing three methods of Sync Mark detection (FIG. 3D) and the standard deviation of the residual error in the phase measurement made over a data signal with random phase shifts across a range of noise levels (using white noise) (FIG. 3E).

With reference to FIG. 3D, the three methods of Sync Mark detection include: (a) matched filter method (where filter coefficients are generated using the noise free readback signal) [the matched filter technique is an optimal linear filtering method for signal detection with additive white Gaussian ("AWG") noise]; (b) MFS signal magnitude method (where the MFS filter sin/cos coefficients are generated as described above with respect to FIG. 3A); and (c) MFS signal in-band to out-of-band energy ratio comparison (which is also described above with respect to FIG. 3A). The number of bits used for a Sync Mark pattern can be chosen based on performance goals and/or requirements, and is not limited to the 54-bit and 36-bit patterns shown in FIG. 3D.

As shown in FIG. 3D, for all three detection methods the maximum peak position (which in FIG. 3D is the lowest servo miss rate, where $-10^1$ corresponds to a servo miss rate of 1 in 10, while $-10^6$ corresponds to a servo miss rate of 1 in 1000000, etc.) of the corresponding method is used to identify the location of the sync mark. For comparison purposes, in addition to the 54-bit Sync Mark patterns (the results of the simulation of which are as denoted in FIG. 3D by the medium gray, light gray, and dark gray solid lines or curves 355a, 360a, and 365a, respectively, corresponding to methods (a), (b), and (c), respectively), a 36-bit Sync Mark pattern is also included in the simulation (the results of the simulation of which are as denoted in FIG. 3D by medium gray, light gray, and dark gray dash-circle lines or curves 355b, 360b, and 365b, respectively, corresponding to methods (a), (b), and (c), respectively). As can be seen for both the 54-bit and the 36-bit patterns, the MFS energy ratio method (the results of which are depicted in FIG. 3D by the dark gray solid line or curve 365a and the dark gray dash-circle line or curve 365b) performs the best, even surpassing the matched filter technique (the results of which are depicted in FIG. 3D by the medium gray solid line or curve 355a and the medium gray dash-circle line or curve 355b).

As described above, the phase of the MFS signal can be computed using Eqn. 4 above. The period of the MFS signal phase measurement is approximately twice the average of the full periods of the MFS sin/cos signals. For example, for the 54 bit pattern shown in FIGS. 3B and 3C, the MFS sine wave has 7 cycles over 54 bits, which implies $$\frac{54}{7} = 7.71$$

bits for the period of mfs_signal_phase measurement. Therefore, when finding the location of the sync mark using the MFS peak magnitude or energy ratio method (methods (b) and (c), respectively, as described above with respect to FIG. 3D), if the initial location (based only on the peak of the mfs_signal_magnitude calculation) is within $$+/- \left(\frac{7.7}{2}\right)$$

bit periods from the true location, the phase measurement can be used to refine the original location to a more exact estimate, which includes the sub-bit phase.

In some embodiments, a two-step phase measurement process can be used for maximum accuracy. Suppose that the initial peak magnitude was initially found with an error of 2 bits away from the true Sync Mark location, the phase would first be computed based on this position, which is off by 2 bits (meaning that the mfs_sin_sum and mfs_cos_sum values are being computed with 2 of the 54 bits being outside the true sync mark window, which will contribute 2 bits of noise to the result). If a second phase measurement is computed based on the adjusted Sync Mark position using the first phase computation, then the second phase computation will be computed more entirely over the Sync Mark signal, which could improve the accuracy of the final second phase measurement.

FIG. 3E depicts the standard deviation of the residual error in the phase measurement made over a data signal with random phase shifts across a range of noise levels (using white noise). As shown in FIG. 3E, the light gray short-dashed line or curve 375 is the phase measurement of a 32-bit window of a single frequency periodic pattern with a 4-bit period, and the gray dot-dash line or curve 380 is the phase measurement of a 64-bit window of a single frequency periodic pattern with a 4-bit period, while the dark gray dashed line or curve 385 is the phase measurement of a 56-bit window of a single frequency periodic pattern with a 8-bit period, and the black solid line or curve 370 is the phase measurement of the 54-bit MFS pattern with a bit period of ~7.7 bits.

As is shown in the plot, the MFS phase performance for a 54-bit pattern (e.g., black solid line or curve 370) performs almost as well as would be expected for a 54-bit single tone of period 7.7 bits. This is very close to, or the same as, the results for the 56-bit window with a single tone 8-bit period (e.g., dark gray dashed line or curve 385). In summary, the MFS phase measurement is very close to the performance of a comparable single tone DFT phase measurement.

The Sync Mark detection using MFS signal-based filtering, as described herein, allows for significant reduction in length of the combined preamble and Sync Mark fields by combining them in a single field. The Sync Mark detection using MFS signal-based filtering, as described herein, also allows for excellent system detection performance for both MFS magnitude and phase of the Sync Mark using a DFT-style computation. The Sync Mark detection using MFS signal-based filtering, as described herein, also allows for detection methods which rely on in-band and out-of-band comparisons, with the energy ratio method (e.g., method (c) as described above with respect to FIG. 3D) being less sensitive to amplitude error and/or variation. The Sync Mark detection using MFS signal-based filtering, as described herein, improves system performance by allowing for higher detection rates and/or providing more bandwidth to be used for data. The Sync Mark detection using MFS signal-based filtering, as described herein, improves circuit area, size, and/or power by providing high performance with fairly easy circuit implementations. For instance, MFS coefficients are easy to generate and are repeatable among a few cycle length choices. And, because the MFS method is based only on apriori known digital patterns, there is no adapted ideal sample dependency or channel bit density dependency.

Figure 4:
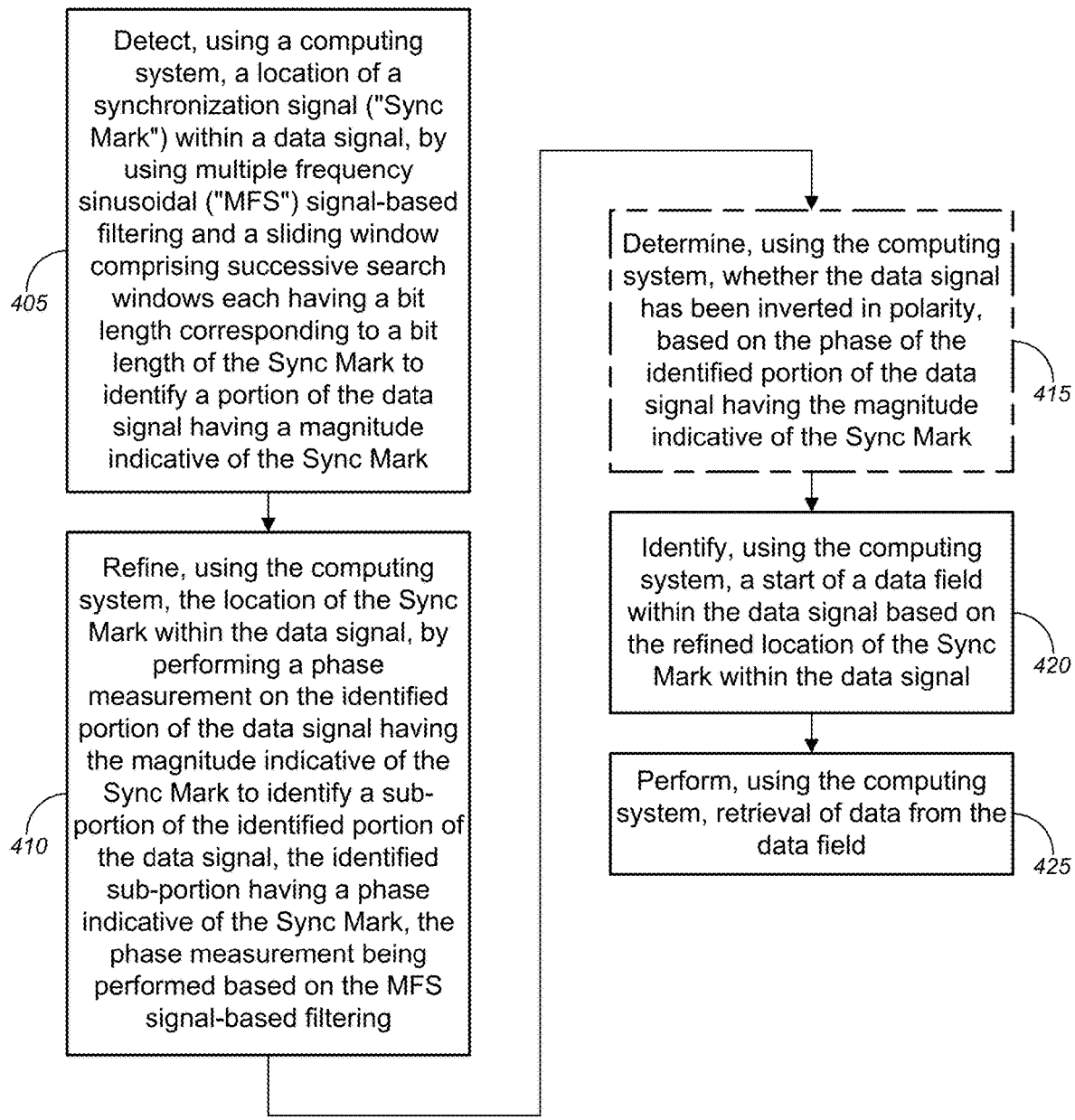
FIG. 4 is a flow diagram illustrating a method for implementing Sync Mark detection using MFS signal-based filtering, in accordance with various embodiments.

These and other functions of the example(s) example 300 (and their components) are described in greater detail herein with respect to FIGS. 1 and 4.

FIG. 4 is a flow diagram illustrating a method 400 for implementing Sync Mark detection using MFS signal-based filtering, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100 and 300 of FIGS. 1 and 3, respectively (or components thereof), such methods may also be implemented using any suitable hardware (or software) implementation. Similarly, while each of the systems, examples, or embodiments 100 and 300 of FIGS. 1 and 3, respectively (or components thereof), can operate according to the method 400 illustrated by FIG. 4 (e.g., by executing instructions embodied on a computer readable medium), the systems, examples, or embodiments 100 and 300 of FIGS. 1 and 3 can each also operate according to other modes of operation and/or perform other suitable procedures.

In the non-limiting embodiment of FIG. 4, method 400, at block 405, may comprise detecting, using a computing system, a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark. At block 400, method 400 may comprise refining, using the computing system, the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being performed based on the MFS signal-based filtering.

According to some embodiments, using the sliding window comprises the computing system: measuring magnitudes of portions of the data signal within one search window; and successively moving the sliding window by one sample along the data signal to form another search window and measuring magnitudes of portions of the data signal within said other search window.

In some embodiments, detecting the location of the Sync Mark comprises multiplying MFS sine coefficients of the Sync Mark and MFS cosine coefficients of the Sync Mark with the portions of the data signal within each successive search window of the sliding window to produce data signal filtered by MFS sine coefficients and data signal filtered by MFS cosine coefficients, respectively, for each search window. The MFS sine coefficients and the MFS cosine coefficients of the Sync Mark may be generated as described above with respect to FIG. 3.

In some cases, the magnitude of the portion of the data signal within each search window is calculated by squaring a sum of the data signal filtered by MFS sine coefficients and squaring a sum of the data signal filtered by MFS cosine coefficients, and calculating a square root of a sum of the squared sum of the data signal filtered by MFS sine coefficients and the squared sum of the data signal filtered by MFS cosine coefficients, as defined, e.g., in Eqn. 3 above.

In some instances, identifying the portion of the data signal having the magnitude indicative of the Sync Mark comprises identifying a portion of the data signal having at least one of a maximum magnitude value or a magnitude value that exceeds a predetermined threshold magnitude value.

In some embodiments, identifying the portion of the data signal having the magnitude indicative of the Sync Mark comprises identifying a portion of the data signal having a maximum in-band to out-of-band energy ratio or having a maximum in-band to total signal energy ratio.

According to some embodiments, the phase of the portion of the data signal within each search window is calculated by taking an arctan of the sum of the data signal filtered by MFS sine coefficients divided by the sum of the data signal filtered by MFS cosine coefficients, as defined, e.g., in Eqn. 4 above.

Merely by way of example, in some cases, method 400 (although not shown in FIG. 4) may further comprise determining, using the computing system, a frequency offset between a frequency of the data signal and an internal clock frequency of an internal clock of the computing system, based on MFS sine coefficients and MFS cosine coefficients. In some instances, method 400 (although not shown in FIG. 4) may further comprise adjusting, using the computing system, the internal clock frequency to match the frequency of the data signal, based on the determined frequency offset. In some cases, determining the frequency offset may comprise: measuring a phase for a first portion of the Sync Mark, by generating MFS sine coefficients and MFS cosine coefficients for the first portion of the Sync Mark and taking an arctan of the sum of the first portion of the Sync Mark filtered by MFS sine coefficients divided by the sum of the first portion of the Sync Mark filtered by MFS cosine coefficients; measuring a phase for a second portion of the Sync Mark, by generating MFS sine coefficients and MFS cosine coefficients for the second portion of the Sync Mark and taking an arctan of the sum of the second portion of the Sync Mark filtered by MFS sine coefficients divided by the sum of the second portion of the Sync Mark filtered by MFS cosine coefficients; calculating a phase difference between the measured phases for the first and second portions of the Sync Mark; and dividing the calculated phase difference by a number of bits between midpoints of the first and second portions of the Sync Mark; as defined, e.g., in Eqn. 5 above.

In some embodiments, method 400 may comprise, at optional block 415, determining, using the computing system, whether the data signal has been inverted in polarity, based on the phase of the identified portion of the data signal having the magnitude indicative of the Sync Mark.

In some cases, the Sync Mark replaces a combination of a single frequency synchronization signal and a preamble. In some instances, the bit length of the Sync Mark is less than a total bit length of the combination of the single frequency synchronization signal and the preamble. Alternatively, the bit length of the Sync Mark is the same as a total bit length of the combination of the single frequency synchronization signal and the preamble. Alternatively, the bit length of the Sync Mark is greater than a total bit length of the combination of the single frequency synchronization signal and the preamble.

According to some embodiments, method 400 may further comprise identifying, using the computing system, a start of a data field within the data signal based on the refined location of the Sync Mark within the data signal (at block 420); and in response to identifying the start of the data field, performing, using the computing system, retrieval of data from the data field (at block 425).

Examples of System and Hardware Implementation

Figure 5:
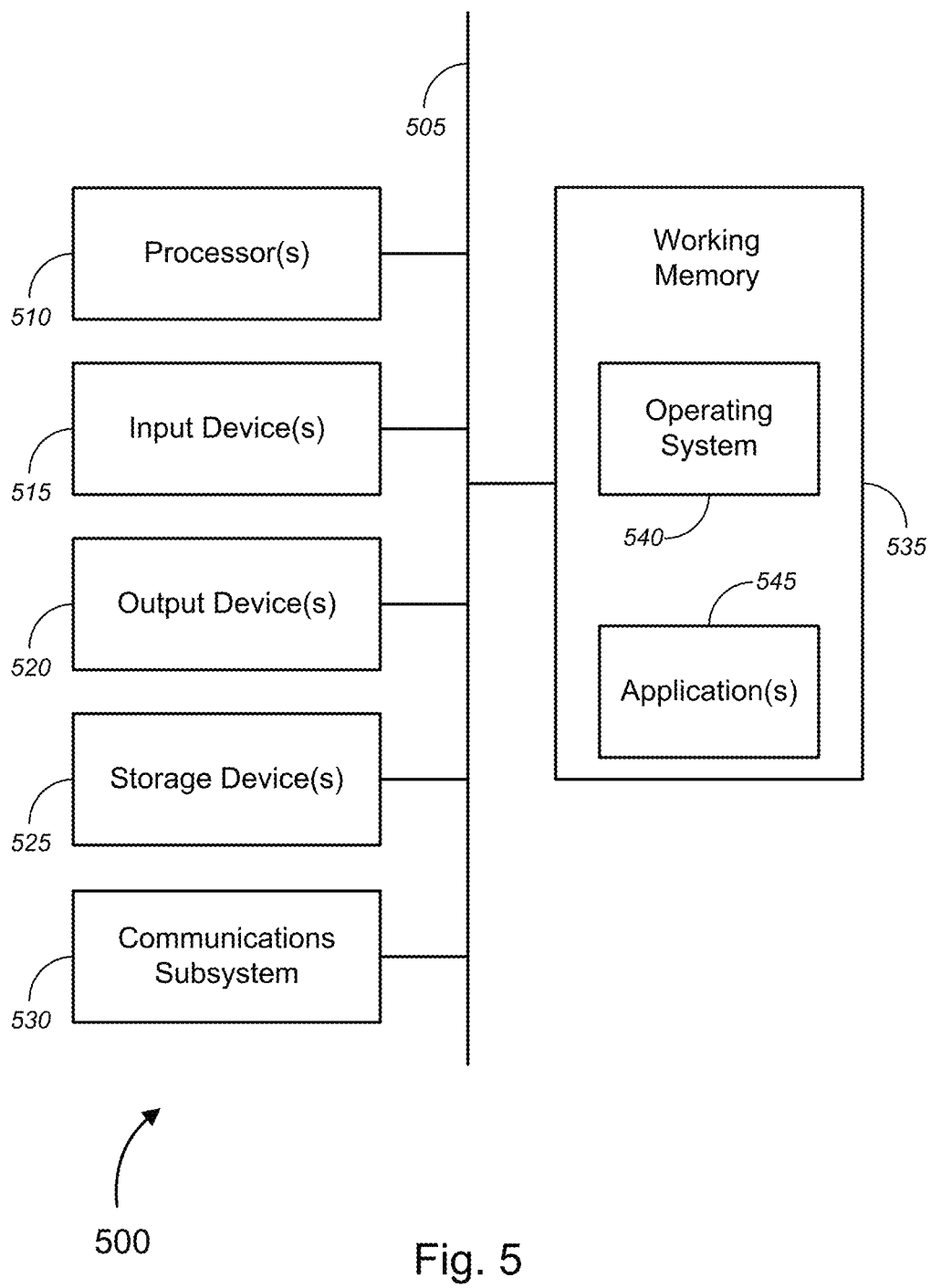
FIG. 5 is a block diagram illustrating an example of computer or system hardware architecture, in accordance with various embodiments.

FIG. 5 is a block diagram illustrating an example of computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system 105a or 105b and user device 115, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system 105a or 105b and user device 115, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with particular requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in some fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While particular features and aspects have been described with respect to some embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while particular functionality is ascribed to particular system components, unless the context dictates otherwise, this functionality need not be limited to such and can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—particular features for ease of description and to illustrate some aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A method for implementing synchronization signal ("Sync Mark") detection, the method comprising:
   detecting, using a computing system, a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark, generating a first MFS coefficient of the Sync Mark and a second MFS coefficient of the Sync Mark, and producing the data signal filtered by the first MFS coefficient and the data signal filtered by the second MFS coefficient; and
   refining, using the computing system, the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being performed based on the MFS signal-based filtering.

2. The method of claim 1, wherein the computing system comprises at least one of a data signal detection processor, a digital signal processor, a data retrieval processor, a processor of a mobile device, a processor of a user device, a server computer, a cloud-based computing system over a network, or a distributed computing system.

3. The method of claim 1, wherein using the sliding window comprises:
   measuring magnitudes of portions of the data signal within one search window; and
   successively moving the sliding window by one sample along the data signal to form another search window and measuring magnitudes of portions of the data signal within said other search window.

4. The method of claim 1, wherein detecting the location of the Sync Mark comprises multiplying MFS sine coefficients of the Sync Mark and MFS cosine coefficients of the Sync Mark with the portions of the data signal within each successive search window of the sliding window to produce data signal filtered by MFS sine coefficients and data signal filtered by MFS cosine coefficients, respectively, for each search window.

5. The method of claim 4, wherein the MFS sine coefficients of the Sync Mark are generated by:
   dividing the Sync Mark into a plurality of positive bit patterns each corresponding to consecutive binary ones in the Sync Mark and a plurality of negative bit patterns each corresponding to consecutive binary zeros in the Sync Mark, the plurality of positive bit patterns alternating with the plurality of negative bit patterns;
   producing a positive sine half cycle having a period corresponding to a number of consecutive binary ones for each of the plurality of positive bit patterns;
   producing a negative sine half cycle having a period corresponding to a number of consecutive binary ones for each of the plurality of negative bit patterns; and
   concatenating positive sine half cycles with negative sine half cycles in the same alternating order as in the corresponding binary ones and binary zeros in the Sync Mark to produce the MFS sine coefficients of the Sync Mark.

6. The method of claim 4, wherein the magnitude of the portion of the data signal within each search window is calculated by squaring a sum of the data signal filtered by MFS sine coefficients and squaring a sum of the data signal filtered by MFS cosine coefficients, and calculating a square root of a sum of the squared sum of the data signal filtered by MFS sine coefficients and the squared sum of the data signal filtered by MFS cosine coefficients.

7. The method of claim 6, wherein identifying the portion of the data signal having the magnitude indicative of the Sync Mark comprises identifying a portion of the data signal having at least one of a maximum magnitude value or a magnitude value that exceeds a predetermined threshold magnitude value.

8. The method of claim 4, wherein identifying the portion of the data signal having the magnitude indicative of the Sync Mark comprises identifying a portion of the data signal having a maximum in-band to out-of-band energy ratio or having a maximum in-band to total signal energy ratio, wherein the in-band energy is calculated by squaring the magnitude of the portion of the data signal, wherein the total signal energy is calculated by summing the squares of all samples of the data signal within a search window, and wherein the out-of-band energy is calculated by subtracting the in-band energy from the total signal energy.

9. The method of claim 4, wherein the phase of the portion of the data signal within each search window is calculated by taking an arctan of the sum of the data signal filtered by MFS sine coefficients divided by the sum of the data signal filtered by MFS cosine coefficients.

10. The method of claim 1, further comprising:
determining, using the computing system, a frequency offset between a frequency of the data signal and an internal clock frequency of an internal clock of the computing system, based on MFS sine coefficients and MFS cosine coefficients, wherein determining the frequency offset comprises:
measuring a phase for a first portion of the Sync Mark, by generating MFS sine coefficients and MFS cosine coefficients for the first portion of the Sync Mark and taking an arctan of the sum of the first portion of the Sync Mark filtered by MFS sine coefficients divided by the sum of the first portion of the Sync Mark filtered by MFS cosine coefficients;
measuring a phase for a second portion of the Sync Mark, by generating MFS sine coefficients and MFS cosine coefficients for the second portion of the Sync Mark and taking an arctan of the sum of the second portion of the Sync Mark filtered by MFS sine coefficients divided by the sum of the second portion of the Sync Mark filtered by MFS cosine coefficients;
calculating a phase difference between the measured phases for the first and second portions of the Sync Mark; and
dividing the calculated phase difference by a number of bits between midpoints of the first and second portions of the Sync Mark; and
adjusting, using the computing system, the internal clock frequency to match the frequency of the data signal, based on the determined frequency offset.

11. The method of claim 1, further comprising:
identifying, using the computing system, a start of a data field within the data signal based on the refined location of the Sync Mark within the data signal; and
in response to identifying the start of the data field, performing, using the computing system, retrieval of data from the data field.

12. An apparatus for implementing synchronization signal ("Sync Mark") detection using multi-frequency sinusoidal signal-based filtering, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
detect a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark, generating a first MFS coefficient of the Sync Mark and a second MFS coefficient of the Sync Mark, and producing the data signal filtered by the first MFS coefficient and the data signal filtered by the second MFS coefficient; and
refine the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being performed based on the MFS signal-based filtering.

13. The apparatus of claim 12, wherein the apparatus comprises at least one of a data signal detection processor, a digital signal processor, a data retrieval processor, a processor of a mobile device, a processor of a user device, a server computer, a cloud-based computing system over a network, or a distributed computing system.

14. The apparatus of claim 12, wherein the data signal is contained in a hard disk drive, wherein the Sync Mark is among a plurality of Sync Marks disposed within the data signal, wherein the data signal comprises at least one data field and a servomechanical ("servo") field, each field being preceded by a Sync Mark among the plurality of Sync Marks.

15. The apparatus of claim 12, wherein the data signal is contained in a signal transmitted over one of a wireless medium or a wired medium.

16. The apparatus of claim 12, wherein detecting the location of the Sync Mark comprises multiplying MFS sine coefficients of the Sync Mark and MFS cosine coefficients of the Sync Mark with the portions of the data signal within each successive search window of the sliding window to produce data signal filtered by MFS sine coefficients and data signal filtered by MFS cosine coefficients, respectively, for each search window.

17. The apparatus of claim 16, wherein the magnitude of the portion of the data signal within each search window is calculated by squaring a sum of the data signal filtered by MFS sine coefficients and squaring a sum of the data signal filtered by MFS cosine coefficients, and calculating a square root of a sum of the squared sum of the data signal filtered by MFS sine coefficients and the squared sum of the data signal filtered by MFS cosine coefficients.

18. The apparatus of claim 16, wherein identifying the portion of the data signal having the magnitude indicative of the Sync Mark comprises identifying a portion of the data signal having a maximum in-band to out-of-band energy ratio or a maximum in-band to total signal energy ratio, wherein the in-band energy is calculated by squaring the magnitude of the portion of the data signal, wherein the total signal energy is calculated by summing the squares of all samples of the data signal within a search window, and wherein the out-of-band energy is calculated by subtracting the in-band energy from the total signal energy.

19. The apparatus of claim 16, wherein the phase of the portion of the data signal within each search window is calculated by taking an arctan of the sum of the data signal filtered by MFS sine coefficients divided by the sum of the data signal filtered by MFS cosine coefficients.

20. A computing system comprising logic that when executed is configured to:
detect a location of a synchronization signal ("Sync Mark") within a data signal, by using multiple frequency sinusoidal ("MFS") signal-based filtering and a sliding window comprising successive search windows each having a bit length corresponding to a bit length of the Sync Mark to identify a portion of the data signal having a magnitude indicative of the Sync Mark, the MFC filtering comprising multiplying MFS sine coefficients of the Sync Mark and MFS cosine coefficients of the Sync Mark with the portions of the data signal within each successive search window of the sliding window to produce data signal filtered by MFS sine coefficients and data signal filtered by MFS cosine coefficients, respectively, for each search window; and refine the location of the Sync Mark within the data signal, by performing a phase measurement on the identified portion of the data signal having the magnitude indicative of the Sync Mark to identify a sub-portion of the identified portion of the data signal, the identified sub-portion having a phase indicative of the Sync Mark, the phase measurement being calculated by taking an arctan of the sum of the data signal filtered by MFS sine coefficients divided by the sum of the data signal filtered by MFS cosine coefficients.

* * * * *